(12) United States Patent
Levecq et al.

(10) Patent No.: US 10,394,016 B2
(45) Date of Patent: Aug. 27, 2019

(54) ELECTROMECHANICAL ACTUATOR FOR DEFORMABLE MIRROR

(71) Applicant: IMAGINE OPTIC, Orsay (FR)

(72) Inventors: Xavier Levecq, Gif-sur-Yvette (FR); Nicolas Lefaudeux, Paris (FR)

(73) Assignee: IMAGE OPTIC, Orsay (FR)

( * ) Notice: Subject to any disclaimer, the term of this patent is extended or adjusted under 35 U.S.C. 154(b) by 29 days.

(21) Appl. No.: 15/563,147

(22) PCT Filed: Mar. 23, 2016

(86) PCT No.: PCT/EP2016/056425
§ 371 (c)(1),
(2) Date: Jan. 12, 2018

(87) PCT Pub. No.: WO2016/156158
PCT Pub. Date: Oct. 6, 2016

(65) Prior Publication Data
US 2018/0172980 A1   Jun. 21, 2018

(30) Foreign Application Priority Data
Mar. 31, 2015  (FR) .................................... 15 52750

(51) Int. Cl.
*G02B 26/08* (2006.01)
*F16F 3/04* (2006.01)

(52) U.S. Cl.
CPC ............ *G02B 26/0825* (2013.01); *F16F 3/04* (2013.01)

(58) Field of Classification Search
CPC .............. G02B 26/0841; G02B 26/085; G02B 26/0816; H01L 2924/0002; B81B 2201/042

(Continued)

(56) References Cited
U.S. PATENT DOCUMENTS 1,304,955 A    5/1919  Fowler
1,630,199 A    5/1927  Megnin
(Continued)

FOREIGN PATENT DOCUMENTS

FR    2847742 A1    5/2004

OTHER PUBLICATIONS

International Search Report issued in PCT/EP2016/056425 dated Jun. 30, 2016 (3 pages).
Written Opinion of the International Searching Authority issued in PCT/EP2016/056425 dated Jun. 30, 2016 (6 pages).

*Primary Examiner* — Mohammed A Hasan
(74) *Attorney, Agent, or Firm* — Osha Liang LLP

(57) ABSTRACT

The invention concerns, in one aspect, an actuator for generating a bidirectional force intended for being integrated into a deformable mirror comprising a deformable reflective substrate. Said actuator comprises a stationary body (10); a drive device; a drive rod (20) able to be driven in a translatory movement with respect to the stationary body (10), along an axis of translation (xx'), by means of the drive device; a floating head (30) designed to be attached to the deformable reflective substrate, and mounted in floating manner with respect to the drive rod via first and second elastic means (33, 35). The first and second elastic means (33, 35) are each mounted between the drive rod (20) and the floating head (30) and are designed to apply forces to the floating head, whose projections on the translation axis (xx') are of opposite directions.

14 Claims, 7 Drawing Sheets

(58) Field of Classification Search
USPC .......................................................... 359/221
See application file for complete search history.

(56) References Cited

U.S. PATENT DOCUMENTS

| | | | |
|---|---|---|---|
| 3,087,469 A | 4/1963 | Evans | |
| 6,192,064 B1* | 2/2001 | Algots | ................. G02B 5/1828 |
| | | | 372/100 |
| 2013/0322471 A1* | 12/2013 | Rossbach | ........... G02B 26/0825 |
| | | | 372/19 |

* cited by examiner

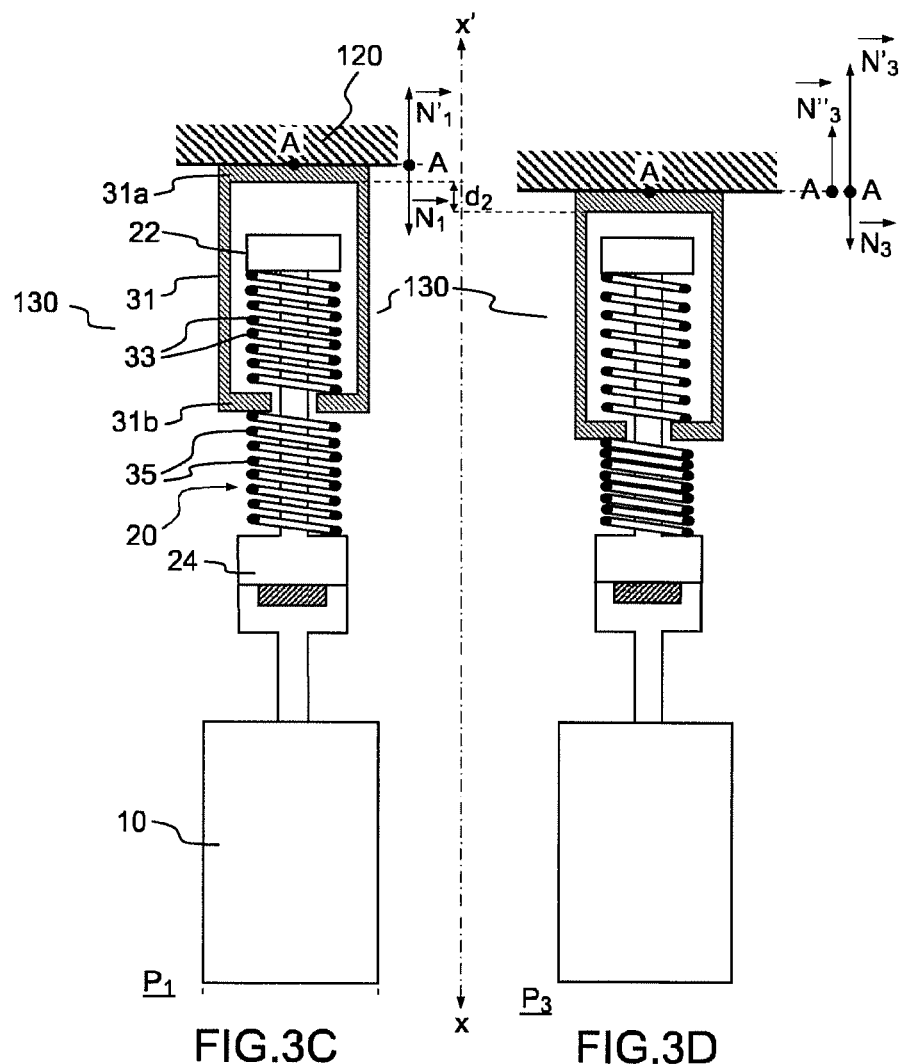

ART ANTERIEUR ic # ELECTROMECHANICAL ACTUATOR FOR DEFORMABLE MIRROR

PRIOR ART

Technical Field

The present description concerns an electromechanical actuator for a deformable mirror. It also concerns a deformable mirror provided with a plurality of electromechanical actuators and applies in particular to the field of adaptive optics.

Prior Art

In the field of power lasers in particular, numerous optical components (mirror, lenses, amplification crystals, etc.) perturb the quality of the wave front of the laser beam. This is due in particular to the increase in the number of amplification stages, the size of the beams and that of the optics, and the energy of the pumping beams. When a user wishes to focus the beam on the target to perform an experiment, the quality of the focus spot is perturbed by these defects of the wave front and the maximum power density at the target is far from being as intense as it could be without these defects. In this configuration, the correction of the wave front by an adaptive optical system makes it possible to obtain, in the end, power densities at the target which are close to the optimal expected values.

An adaptive optical system generally comprises a system for measurement of the wave front and a system for modulation of the wave front allowing a correction of the defects of the wave front. In the field of power lasers, the system for modulation of the wave front generally comprises a deformable mirror. A deformable mirror is composed of a deformable reflective substrate and actuators enabling a local deformation of the latter in a controlled manner.

At present, many types of actuators exist for a deformable mirror, adapted to the local deformation of the reflective substrate.

Some of the known actuators are based on piezoelectric, electrostrictive or magnetostrictive materials. These actuators have the drawback not only of having a substantial degree of hysteresis, but also requiring the use of a complex control function in order to regulate the applied force. Furthermore, these actuators need a continual and uninterrupted energy supply in order to maintain the deformation applied to the reflective substrate.

Other actuators, of electromechanical type, comprise a step motor or a direct current motor able to maintain the force applied without the need for a continual energy supply. Patent FR 2 847 742 thus describes an actuator of electromechanical type adapted to a short travel displacement (micrometrical) of an element. Such an actuator moreover enables the generating and controlling of a bidirectional force; one example of such an actuator is represented in FIG. 6. The actuator 200 comprises a stationary body 202 and a movable assembly with a first portion 204 connected to the stationary body via a first elastic means 280, in this example a compression spring, and a second portion 206 connected to the first portion via a second elastic means 207, in this example an assembly of traction springs. The first movable portion 204 is, for example, a casing designed to come into contact with an element 220 on which a force needs to be applied (represented by broken line in FIG. 6). The second portion 206 of the movable assembly is displaced by a drive means 213, such as a micrometer positioning jack with a finger 231, to provide a translation of the movable assembly with respect to the stationary body 202. The actuator 200 makes it possible to maintain a force applied to an element without the need for a continual energy supply. However, due to its design, the drive means 213 of the actuator 200 presents an imbalance between the force which it transmits and the force which it experiences. In fact, even at the midtravel of the jack, when the actuator 200 is in a neutral position from the standpoint of the force transmitted to the element 220, that is, the forces exerted by the springs 207 and 280 oppose each other so that no force is transmitted via the floating casing 204, the drive means continues to undergo a force due to the reaction exerted by the second movable portion 206 on the finger 231 of the jack 213. The permanent force experienced by the drive means causes premature wear on certain parts.

The present description proposes an electromechanical actuator for a deformable mirror which is able to mitigate the aforesaid inconveniences.

SUMMARY

According to a first aspect, the present description concerns an actuator for generating a bidirectional force, that is, for generating a force along one or another of two opposite directions; the actuator according to the first aspect is adapted to be integrated in a deformable mirror comprising a deformable reflective substrate so that, once integrated in the deformable mirror, it is able to apply a force to the deformable reflective substrate in order to deform it.

The actuator comprises a stationary body, a drive device, a drive rod able to be driven in a translatory movement with respect to the stationary body along an axis of translation by means of the drive device, and a floating head designed to be attached to the deformable reflective substrate. The floating head is mounted in floating manner with respect to the drive rod via first and second elastic means, each one mounted between the drive rod and the floating head and designed to apply forces to the floating head, whose projections on the translation axis are of opposite directions.

The configuration of the first and second elastic means between the drive rod and the floating head enables an equilibrium to be provided between the forces transmitted by the actuator and the forces experienced by the drive device when the actuator is integrated in the deformable mirror. In this way, in a neutral position of the drive rod for which no force is applied to the deformable substrate, the drive device experiences no reactive force of the first and/or second elastic means, which prevents a premature wear on the parts of the drive device.

Furthermore, since the first elastic means and the second elastic means are configured so as to apply to the floating head forces which project in opposite directions on the translation axis, it is possible for the actuator to generate a bidirectional force on the deformable reflective substrate when the latter is integrated in the deformable mirror.

According to one or more embodiments, the first and second elastic means are prestressed so that in a neutral position of the drive rod for which no force is applied to the deformable substrate, the forces applied respectively by the first elastic means and the second elastic means are nonzero and opposite each other. This configuration allows each of the elastic means to contribute to generating the force when a nonzero force is being generated on the substrate in one direction or the other.

According to one or more embodiments, each elastic means comprises one or more springs, such as one or more traction or compression springs.

According to one or more embodiments, at least one elastic means comprises between two and four traction springs, such as 3 traction springs.

According to one or more embodiments, at least one elastic means comprises a compression spring centered on the drive rod.

According to one or more embodiments, the drive rod of the actuator comprises a drive arm and a rod mounted in removable manner on the drive arm. The first and second elastic means are then arranged between the floating head and the rod. One embodiment in which the rod is removable is made possible because none of the elastic means connect the floating head and the stationary body of the actuator. Thus, it is possible to attach the actuator to the deformable substrate of the mirror and, in event of wear or deterioration of the drive device, the latter may be easily detached from the actuator and a new drive device can be installed without it being necessary to intervene in the substrate or near the deformable substrate of the mirror, which avoids any risk of damage.

According to one or more embodiments, the rod comprises means of coupling the rod to the drive arm, said coupling means according to one example comprising one or more magnets arranged on the one or the other of the rod and the drive arm, which enables an easy coupling and uncoupling of the removable portion of the actuator.

According to one or more embodiments, the floating head comprises a casing arranged about an upper portion of the drive rod, the casing having an upper wall designed to be attached to the deformable substrate and a lower wall, opposite the upper wall, and the first elastic means is mounted between the upper portion of the drive rod and the lower wall of the casing.

According to one example, the second elastic means is mounted between a lower portion of the drive rod situated outside of the casing and the lower wall of the casing.

According to another example, the second elastic means is mounted between the upper portion of the drive rod and the upper wall of the casing.

According to one or the other of these examples, in one embodiment the first elastic means and the second elastic means are identical.

According to one or more embodiments, the first elastic means works by compression and is mounted between the drive rod and the floating head and the second elastic means works by traction and is mounted between the drive rod and the floating head. In this embodiment, the floating head moreover does not necessarily have a casing arranged about the drive rod. The floating head may have any given shape; it comprises a wall designed to be attached to the deformable reflective substrate and a wall to which are joined the first and second elastic means, it being possible for these walls to be merged into a single wall.

According to one or more embodiments, the drive rod comprises at least one cross piece for the mounting of the first and/or the second elastic means. The cross piece facilitates the mounting of the elastic means. In the examples in which the first and second elastic means are attached respectively in the area of an upper portion of the drive rod and a lower portion of the drive rod, the drive rod may comprise a first and a second cross piece. In the examples in which the actuator comprises coupling means between a drive arm and a removable rod, a cross piece may be formed by the coupling device.

According to one or more embodiments, the drive device comprises a linear motor, enabling a controlled displacement of the drive rod, for example, a micrometer displacement. The linear motor may be formed by any means known to the person skilled in the art which enables a driving of the drive rod in translation; for example, a rotary motor associated with a nut and bolt system, a micrometer jack, a piezoelectric motor, a magnetic motor, an electrostrictive motor, etc.

According to a second aspect, the present description concerns a deformable mirror comprising a frame, a deformable reflective substrate mounted on the frame and a plurality of actuators as previously described. According to one or more embodiments, the stationary body of each actuator is integrated in the frame and the floating head of each actuator is integrated in the deformable reflective substrate.

The linkage between the reflective substrate and the frame may be a flexible linkage or a rigid linkage.

According to one or more embodiments, the frame comprises, for each actuator, a housing able to receive at least partly the stationary body of the actuator. It also comprises a surface near the housing forming an abutment for the drive rod.

BRIEF DESCRIPTION OF THE DRAWINGS

Other advantages and characteristics of the invention will appear upon perusal of the description, illustrated by the following figures which show:

FIGS. 3A, 3B, 3C and 3D, diagrams illustrating different states of an actuator according to the present description;

For reasons of consistency, the identical elements are given the same reference numbers in the different figures.

DETAILED DESCRIPTION

Figures 1A, 1B:
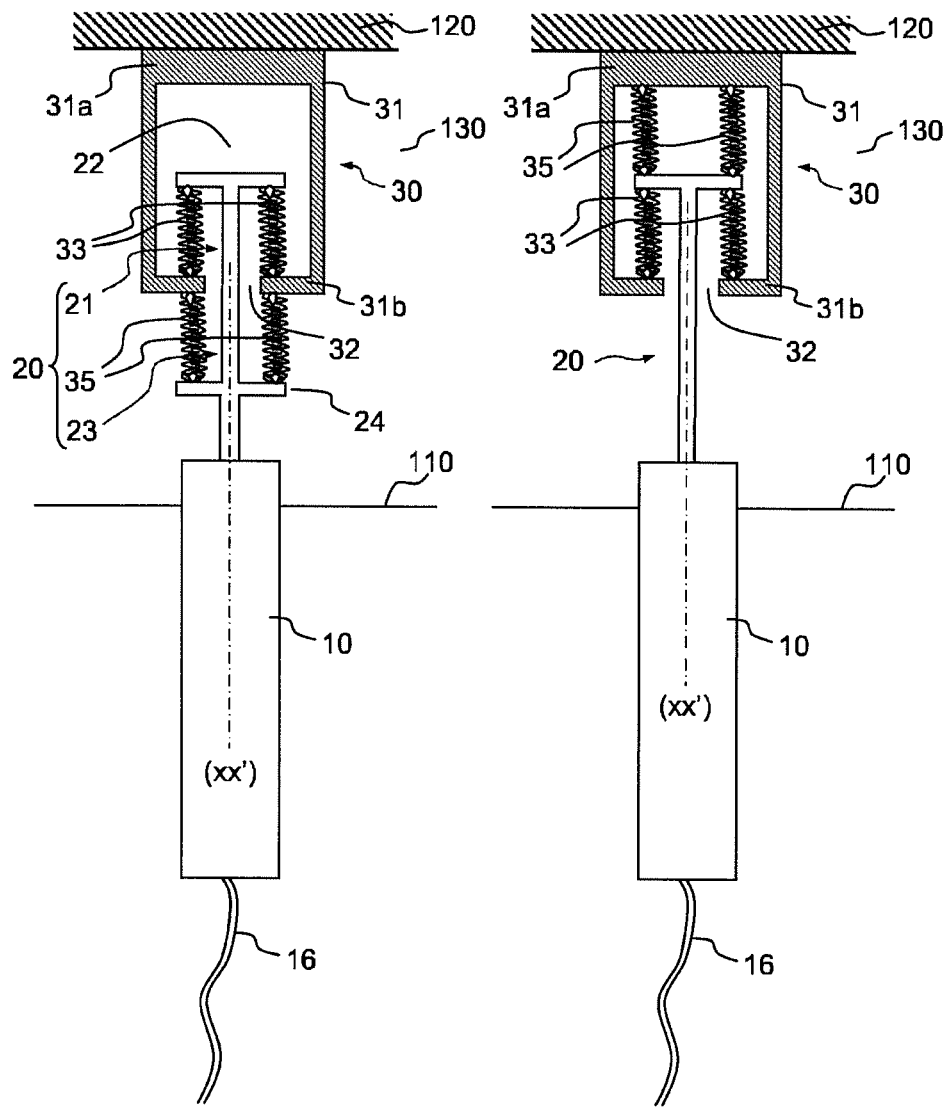
FIGS. 1A to 1C, diagrams illustrating examples of electromechanical actuators for a deformable mirror, according to the present description.
Figure 1C:
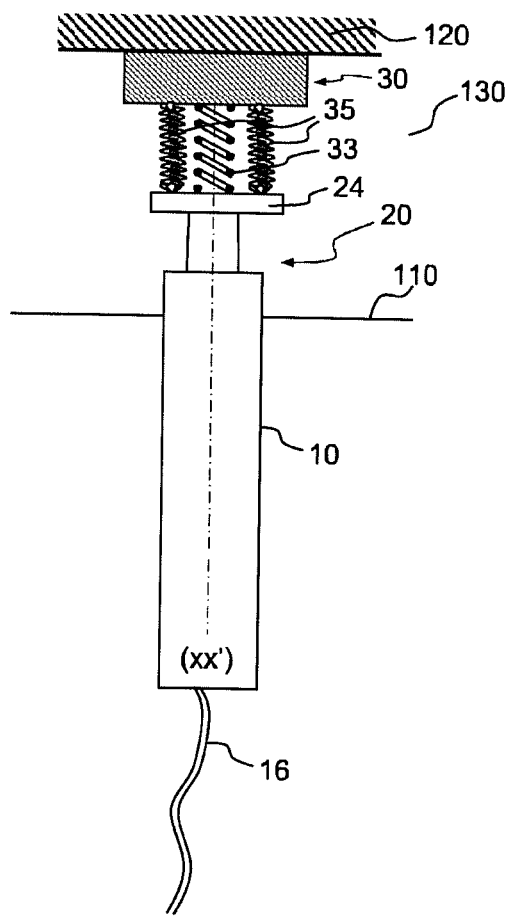

FIGS. 1A to 1C represent different examples of electromechanical actuators 130 adapted to the generating of a bidirectional force on a deformable reflective substrate 120 of a deformable mirror.

The actuator 130 represented in each of the examples of FIGS. 1A to 1C comprises a stationary body 10, a drive rod 20 able to be driven in a translatory movement along an axis of translation (xx') with respect to the stationary body 10 by means of a drive device (not represented in FIGS. 1A to 1C), and a floating head 30 designed to be attached to the deformable substrate 120, the floating head 30 being connected to the drive rod 20 via first and second elastic means 33, 35. The drive device is for example electrically energized by means of an electrical power supply 16.

The elastic linkages between the head 30 and the drive rod 20 give the head its floating nature. This type of linkage enables misalignments or angular and lateral movements between the drive rod and the floating head 30 in contact with the deformable substrate 120 without causing a parasitic torque which might produce an unwanted deformation of the substrate. Moreover, the first and second elastic means 33, 35 are devised so as to apply forces to the floating head, the projections of said forces on the axis of translation (xx') having opposite directions. This arrangement, as shall be described below, enables the application of a bidirectional force, that is, a pushing or a pulling force, to the deformable substrate 120.

Figure 2A:
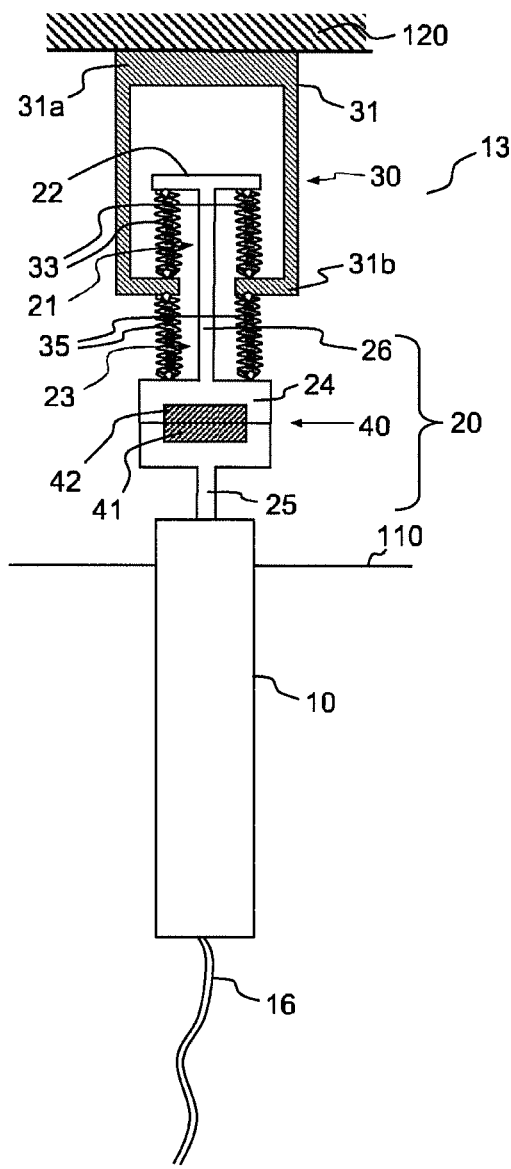
FIG. 2A, a diagram illustrating one variant of the actuator represented in FIG. 1A, in which the drive rod comprises a drive arm and a rod mounted in removable manner on the drive arm.
Figure 2B:
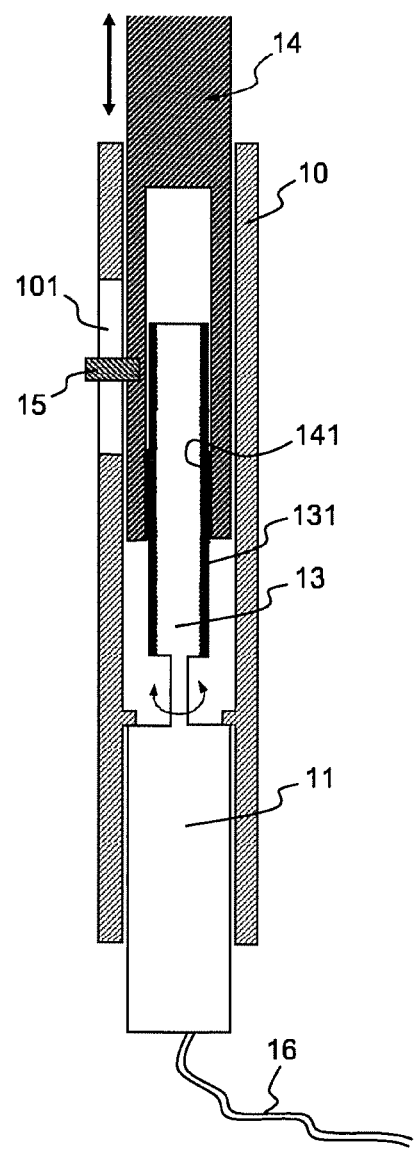
FIG. 2B, a diagram representing an example of a linear motor comprising a nut and bolt system driven by a rotary motor, according to one sample embodiment.

The drive device comprises for example a linear motor, one example of which is described in FIG. 2B, and it allows a movement in translation of the drive rod along an axis of translation (xx'). The movement in translation of the drive rod has a total amplitude for example on the order of a millimeter, and it is transformed by means of the actuator 130 into a controlled force applied to the deformable substrate 120 so as to generate deformations whose total amplitude may be on the order of several microns with a nanometer resolution. The amplitude of the deformations depends on the stiffness of the deformable substrate and of the means of attachment of the substrate to the frame.

The first and second elastic means (33, 35) in the examples of FIGS. 1A to 1C each comprise one or more traction or compression springs, and they are mounted between the drive rod 20 and the floating head 30. For example, an elastic means may comprise between 2 and 4 traction springs; for example, 3 traction springs for an elastic means enable a good distribution of the force. In the case of using a compression spring, this can be centered on the axis of the drive rod, as represented in FIG. 1C (spring 33). Alternatively, each elastic means may comprise one or more elements of elastic material, such as one or more elements formed from blocks of rubber or silicone.

In one sample embodiment, the elastic means 33 and 35 are prestressed. Thus, in a neutral position of the drive rod for which no force is applied to the deformable substrate, the forces applied respectively by the first elastic means and by the second elastic means are nonzero and opposite each other. This configuration, as shall be described in further detail below, makes it possible for each of the elastic means to contribute to generating force during the generating of a nonzero force on the substrate in one direction or the other.

Several arrangements of the first and second elastic means between the drive rod and the floating head are possible to enable the first elastic means 33 and the second elastic means 35 to exert forces of opposite direction, or more precisely, having oppositely directed projections on the axis of translation (xx'). FIGS. 1A to 1C show three examples of this, without these being limiting examples.

In the examples represented in FIGS. 1A and 1B, the floating head 30 comprises a casing 31 arranged partly around the drive rod 20. The casing 31 comprises at least one upper wall 31a designed to be attached to the deformable reflective substrate 120 of a deformable mirror 100 and one lower wall 31b opposite the upper wall 31a. The lower wall 31b has an orifice 32 through which the drive rod 20 passes so that an upper portion 21 of said drive rod 20 is located inside the casing 31. The casing 31 is represented with a cross section of substantially rectangular shape in the plane of the drawing. It should be noted, however, that the casing 31 may have any other shape (cylindrical, parallelepiped, etc.), as long as it comprises a first wall, or side, designed to be attached to the deformable substrate 120 and a second wall, or side, opposite the first wall and provided with an orifice able to let the drive rod 20 pass through it with play on either side of the rod.

In the example of FIG. 1A, the first elastic means 33 comprises a plurality of identical traction springs, attached on the one hand to the upper portion 21 of the drive rod and on the other hand to the lower wall 31b of the casing 31, and more precisely on the inside (with respect to the casing) of this wall. The second elastic means 35 likewise comprises a plurality of traction springs identical to those forming the first elastic means, attached on the one hand to the lower wall 31b of the casing 31 and on the other hand to a lower portion 23 of the drive rod located outside of the casing. More precisely, in this example, the second elastic means 35 is attached to the outside (with respect to the casing) of the lower wall 31b.

In the example of FIG. 1B, the springs of the first elastic means 33 are likewise attached between the upper portion 21 of the drive rod and the lower wall 31b of the casing 31, but the springs of the second elastic means 35 are attached between the upper portion 21 of the drive rod and the upper wall 31a of the casing 31. In this example, the first and second elastic means are attached on the inside (with respect to the casing) of the lower and upper walls, respectively.

In the examples represented in FIGS. 1A and 1B, the first and second elastic means 33, 35 comprise traction springs, for example three springs positioned 120° about a longitudinal axis of the drive rod 20. Alternatively, the first and second elastic means 35 comprise one or more compression springs, or any other elastic means.

In the example of FIGS. 1A and 1B, the elastic means 33 and 35 may be identical, for example, formed by springs of the same length and the same stiffness.

In the example represented in FIG. 1C, the first elastic means 33 works by compression and is mounted between the drive rod 20 and the floating head 30 and the second elastic means 35 works by traction and is mounted between the drive rod and the floating head 30. Again, in this example, the first elastic means 33 may comprise one or more compression springs, for example one compression spring centered on the axis of the drive rod and the second elastic means 35 may comprise one or more traction springs, for example three springs distributed at 120° about the longitudinal axis (xx') of the drive rod 20. The floating head in this example is no longer necessarily a casing with an opening allowing one end of the drive rod to pass through. The floating head may have any given shape, solid or hollow, with one wall designed to be attached to the deformable substrate and one wall on which the elastic means are mounted. In the example of FIG. 1C, the two walls are merged into a single wall 30, one side of which is designed to be attached to the substrate and the other side is designed to mount the first and second elastic means.

In one or more embodiments, the drive rod 20 comprises at least one cross piece for the mounting of the first and/or second elastic means.

Thus, in the example of FIG. 1A, the drive rod 20 comprises a first cross piece 22 positioned in the area of the upper portion 21 of the drive rod 20, for example, at the end of the upper portion 21. The drive rod 20 in this example comprises a second cross piece 24 in the area of the lower portion 23 of the drive rod 20. In the example of FIGS. 1B and 1C, the drive rod comprises a single cross piece for the mounting of the elastic means: in the example of FIG. 1B, only the cross piece 22 is used for the mounting of the first and second elastic means 33, 35 and in the example of FIG.

1C only the cross piece 24 is used for the mounting of the first and second elastic means 33, 35.

Each of the cross pieces 22 and 24 can form a base to which the elastic means, respectively 33 and 35, may be attached when they are formed by traction springs, for example. The cross pieces 22 and 24 may likewise each faun a bearing surface against which the elastic means 33, 35 may be compressed when they are formed as compression springs.

Whatever the embodiment contemplated for the arrangement of the elastic mans, because of the fact that the first elastic means and the second elastic means join the floating head and the drive rod, and therefore neither one is joined to the stationary body, the forces transmitted by the actuator to the deformable substrate 120 and the forces experienced by the drive device via the floating head are of the same amplitude. Thus, in a neutral position of the drive rod for which no force is applied to the substrate, the drive rod forms with the floating head an isolated mechanical system and the drive device does not experience any force because of the first and/or second elastic means.

Furthermore, the fact that the elastic means 33, 35 are arranged between the floating head 30 and the drive rod 20—so that there is no linkage between the floating head and the stationary body—likewise entails the possibility of a removable rod with respect to the drive device.

FIG. 2A thus represents one sample embodiment of an electromechanical actuator according to the present description in which the drive rod 20 comprises a drive arm 25 and a rod 26 mounted in removable manner on the drive arm 25. This variant may apply howsoever the elastic means 33, 35 are arranged between the floating head 30 and the drive rod 20.

The drive arm 25 is driven by the drive device and is connected to the rod 26, for example through coupling means 40, likewise known as a coupling device. These coupling means 40 enable a removable assembly of the rod 26 on the drive arm 25. In this way, if the drive device is worn down or damaged, it may easily be removed from the portion comprising the rod 26 and the floating head 30 designed to be attached to the deformable reflective substrate 120; a new drive device may then be installed without the need for any intervention in the substrate or in the proximity of the substrate. Such an intervention, away from the substrate of the mirror, allows one to avoid any damage to said substrate.

As represented in FIG. 2A, the coupling means 40 may be at least partly incorporated in the drive arm 25 and/or the rod 26. In this embodiment, the coupling means 40 may comprise one or more magnets. In one variant, the coupling means 40 comprise a single magnet 41 or 42 inserted in the drive arm 25 or the rod 26 and able to hold the rod with the drive arm; in this variant, the element (rod or drive arm) not containing the magnet comprises at least one part made of ferrous material, such as low carbon steel, which is able to be attracted by the magnet. In one variant of this embodiment, shown in FIG. 2A, the coupling means 40 comprise a first magnet 41 integrated in the end of the drive arm 25 and a second magnet 42 incorporated in the lower portion 23 of the rod 26. According to one variant, the magnet 42 is integrated in the second cross piece 24 of the rod 26 when this second cross piece is present for the mounting of the first and/or second elastic means 33, 35 (the case of FIGS. 1A and 1C, for example). According to these variants, the coupling force is calculated so as to preserve a solid connection between the arm 25 and the rod 26, for the entire range of forces of the actuator 130.

According to one variant, the coupling means 40 may comprise elements independent of the drive arm 25, positioned and attached to the junction between the rod 26 and the drive arm 25 (not represented in the figures) in order to enable the assembly, for example, a through screw or a clamping collar. In general, any type of attachment may be used as long as it allows holding the rod 26 assembled with the drive arm 25 while ensuring the removability of the portion of the actuator comprising the drive arm and the drive device, for example, to allow a replacement.

Whatever the embodiment chosen for the coupling device 40, the coupling force of the rod 26 to the drive arm 25 may be chosen less than the maximum allowable force given by the nonrigid elements of the floating head 30, namely, the elastic means 33 and 35, for example. In this way, the force exerted on the coupling means 40 for removing the rod 26 from the drive arm 25 is not liable to damage these elastic elements.

FIG. 2B represents an example of a drive device according to the present description. In this figure, only the stationary body 10 of the actuator and the drive device are represented.

The drive device comprises a rotary motor 11 driving in rotation a threaded rod 13 (threading 131), itself driving a nut 14 (threading 141), locked in rotation by a pin 15 which is able to move in a groove 101 of the stationary body 10. The result of the rotation of the threaded screw 13 is a translation of the nut 14 along a direction depending on the direction of rotation of the screw. The nut 14 may be connected to the drive rod or it may form directly the drive arm 25 (FIG. 2A).

FIGS. 3A to 3D illustrate, in one example, the functioning of the actuator according to the present description. In these figures, the actuator 130 is of the type as described in FIG. 1A (or in FIG. 2A), with a first elastic means 33 arranged between a first cross piece 22 of an upper portion 21 of the drive rod located inside the casing 31 forming the floating head 30 and the lower wall 31b of the casing 31 and a second elastic means 35 arranged between the lower wall 31b of the floating casing and a second cross piece 24 of a lower portion 23 of the drive rod. In the example shown as an illustration in FIGS. 3A to 3D, the elastic means 33 and 35 each comprise a prestressed compression spring mounted around the drive rod 20. Whatever the embodiment of the actuator, however (and especially the one or the other of the examples described in FIGS. 1A to 1C), the principle described with the aid of FIGS. 3A, 3B, 3C and 3D may be applied.

Figures 3A, 3B:
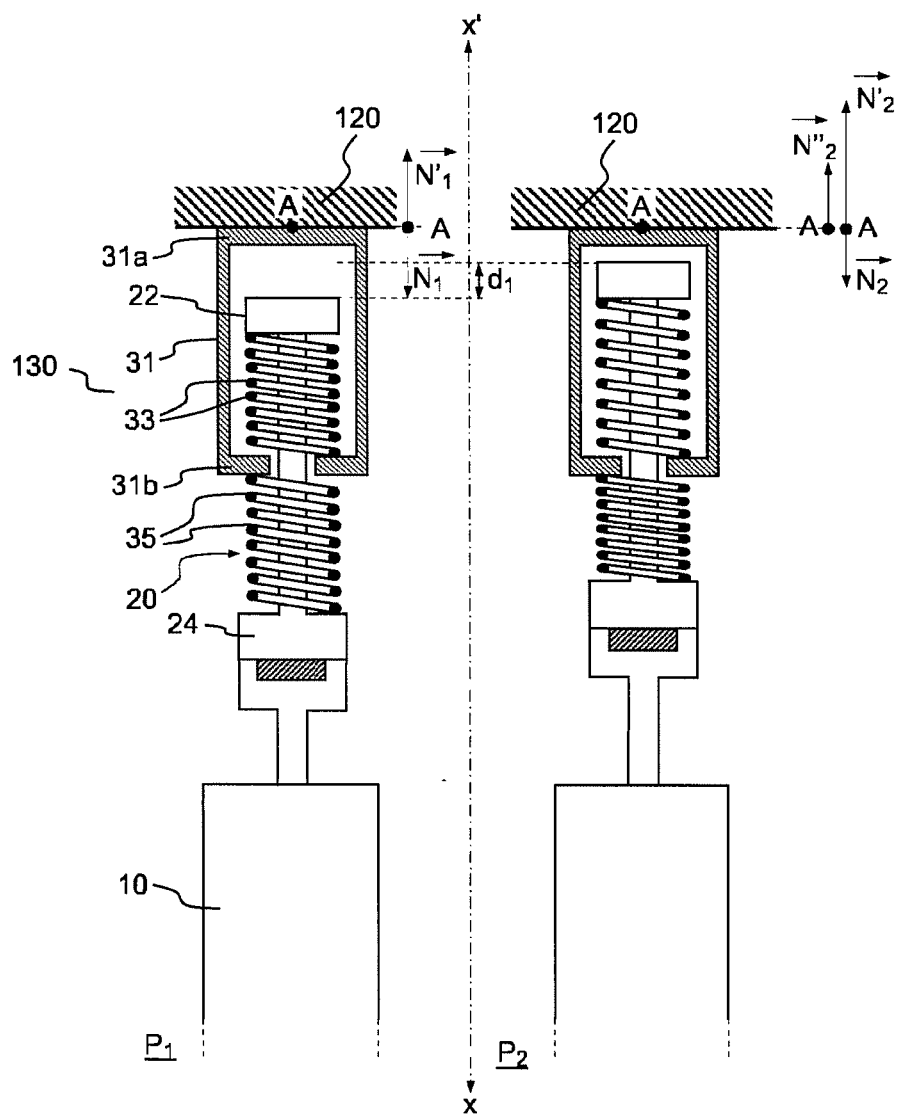

FIGS. 3A and 3C, which are identical, represent the actuator 130 in the neutral position of the drive rod, denoted as $P_1$, a position in which the actuator applies no force to the reflective substrate 120. FIG. 3B represents the actuator 130 in a state of actuation, when the drive rod is moved in one direction or the other with respect to the neutral position (position $P_2$). FIG. 3D represents the actuator 130 in the case of a reaction of the substrate to the actuator, resulting for example from the force of reaction of the deformable substrate on the floating head under the effect of the other actuators, resulting in a displacement of the floating head (position $P_3$).

In the neutral position $P_1$ illustrated in FIGS. 3A and 3C, the floating head 30 applies no force to the deformable substrate 120. In this position, in fact, the forces generated on the casing 31 by the first and second springs 33 and 35, which are prestressed so as to be located roughly midway in their amplitude of compression, are opposite. Thus, in this example, the first spring 33 exerts a force $N_1$ on the casing 31, in a direction denoted x in FIG. 3A, and the second spring 35 exerts a force $N'_1$ on the casing 31 in an opposite direction x'. In FIGS. 3A to 3D, all the forces are determined in the area of a point of application A of the casing situated in the area of the wall in contact with the deformable substrate. For easier reading, the forces are represented outside the diagram of the actuator. The forces $N_1$ and $N'_1$ are equal in absolute value but opposite in direction, such that the resultant force $N''_1$ is zero. Thus, no force is transmitted by the floating head 30 to the substrate 120. Furthermore, since the forces $N_1$ and $N'_1$ are only applied between points of the drive rod and the floating head, and the sum of these forces is zero, the assembly formed by the drive rod and the floating head forms an isolated mechanical system and neither is any force applied to the drive device, making it possible to limit the wear on it.

As previously explained, the first and second springs 33, 35 are prestressed during their mounting in the actuator so as to allow each spring to contribute to the force applied to the deformable substrate. The prestressing of each of the springs is equal, for example, to half the total amplitude of compression of each of the springs. Thus, for example, if each spring has an amplitude of compression corresponding to the application of a force to the casing 31 varying respectively between 0 and 20 N for one of the springs and 0 and −20 N for the second spring, each of the two springs could be prestressed so as to apply, in neutral position, a force equaling respectively 10 N and −10 N.

When the drive device is placed in operation, for example, the linear motor illustrated in FIG. 2B, the drive rod is displaced in translation, for example in the direction x' with an amplitude $d_1$, as is shown in FIG. 3B, so as to find itself in a position of actuation referenced as $P_2$. It should be noted that in the absence of a substrate 120 to present a resistance to the thrusting force generated by the drive device, the floating head would be displaced by an identical distance $d_1$. In the presence of the deformable substrate whose force of reaction is opposed to the displacement of the floating head, under the effect of the displacement $d_1$ of the drive rod 20 toward the substrate 120, the second spring 35 is compressed more and the first spring 33 is decompressed. The second spring 35 thus exerts a force $N'_2$ on the casing 31, in the direction x', with absolute value greater than $N'_1$. The first spring 33 exerts a force $N_2$ on the casing 31, in the direction x, with absolute value less than $N'_1$. The resulting force $N''_2$ applied to the casing 31 is equal to the sum of $N'_2$ and $N_2$ and the two springs 33 and 35 work together to generate the actuating force $N''_2$. The resultant force $N''_2$ is likewise the actuating force applied by the floating head 30 to the substrate 120, and in the example of FIG. 3B it is exerted in the direction x', that is, in the thrusting direction.

In symmetrical manner, when the drive rod 20 is driven in translation in the direction x with an amplitude $d_1$, the first spring 33 compresses and the second spring 35 decompresses, generating an actuating force equal, in absolute value, to the actuating force $N''_2$ but of opposite direction. In this case, a force is exerted on the deformable substrate in the traction direction.

Thus it is seen that, in an actuator according to the present description, when the first and second elastic means are prestressed, they act together (the variations in force are of the same sign) to exert either a pushing or a pulling. Thus, with ranges of force between, for example, 0 and 20 N for each elastic means on the floating head, one could achieve a range of force between −20 and +20 N for the actuator acting on the deformable substrate.

Figure 6:
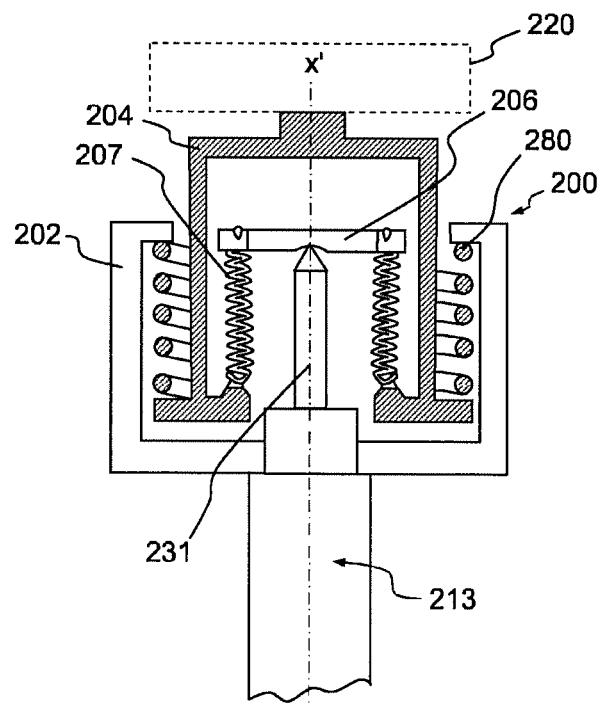
FIG. 6, a diagram of an actuator of the prior art.

The configuration of the floating head 30 according to the present description furthermore makes it possible for the forces transmitted by the floating head 30 onto the drive device to be of the same amplitude (but opposite in direction) as the forces applied by the floating head 30 to the substrate 120. In fact, regardless of the configuration, at equilibrium (that is, when the elements of the actuator are no longer in motion), since the floating head is only connected to the substrate and to the drive device via the drive rod, an equilibrium is established between the force applied by the floating head to the substrate and the force applied by the floating head to the drive device via the drive rod. As has already been mentioned, the drive device, in the neutral position, therefore experiences no stress on the part of the floating head via the drive rod and experiences a force within the same range of force as that provided to the substrate in an actuating position. Thus, for example, if the actuator provides a range of forces between −20N and +20N, then the forces experienced by the drive device on the part of the floating head via the drive rod are likewise between −20N and +20N. This equilibrium of forces applied to the drive device has the effect that the parts of the actuator 130 are not worn out prematurely. In the device of the prior art, such as is described in FIG. 6, on the contrary, the force experienced by the drive device is never canceled out and it is always applied in the same direction, encouraging a wearing of the parts.

When the drive device comprises a rotary motor associated with a drive system of the nut and bolt type, as is represented in FIG. 2B for example, one has the advantage of preserving its position when it is at rest, that is, when the electrical power supply is cut off. The drive rod 20 may thus maintain an actuating position $P_2$ and the force on the substrate 120 may be maintained when the motor is halted.

As is illustrated in FIG. 3D, in a deformable mirror the substrate 120 may happen to be deformed substantially, for example due to the effect of adjacent actuators. A displacement $d_2$ of the deformable substrate entails a displacement of the floating head, which then generates a force of reaction on the casing 31. In fact, under the effect of the displacement $d_2$, the first spring 33 is decompressed and the second spring 35 is compressed. The second spring 35 then exerts a force $N'_3$ on the casing 31, in the direction x', with absolute value greater than $N'_1$. The first spring 33 exerts a force $N_3$ on the casing 31, in the direction x, with absolute value less than $N_1$. The resulting force $N''_3$ applied to the casing 31 is equal to the sum of $N'_3$ and $N_3$. The resulting force $N''_3$ is the force of reaction applied by the floating head 30 to the substrate 120, in the direction x'. In this case, the two springs 33 and 35 work together to generate the force of reaction $N''_3$.

In the case when the distance $d_1$ of displacement of the drive rod 20 (FIG. 3B) is equal in absolute value to the distance of displacement $d_2$ of the deformable substrate 120, the force of reaction $N''_3$ applied by the floating head 30 to the deformable substrate 120 is equal in absolute value to the actuating force $N''_2$ applied by said floating head 30 to the deformable substrate 120. Thus, the actuating force $N''_2$ of the actuator is equal to its force of reaction $N''_3$.

In the examples of FIGS. 3A to 3D, it is assumed that the springs apply forces in a direction parallel to that of the axis of translation (xx'). In practice, depending on how the springs are mounted, the forces applied may include a component not parallel to the axis of translation, in which case one will consider the projections of the forces on the axis of translation.

Figure 4:
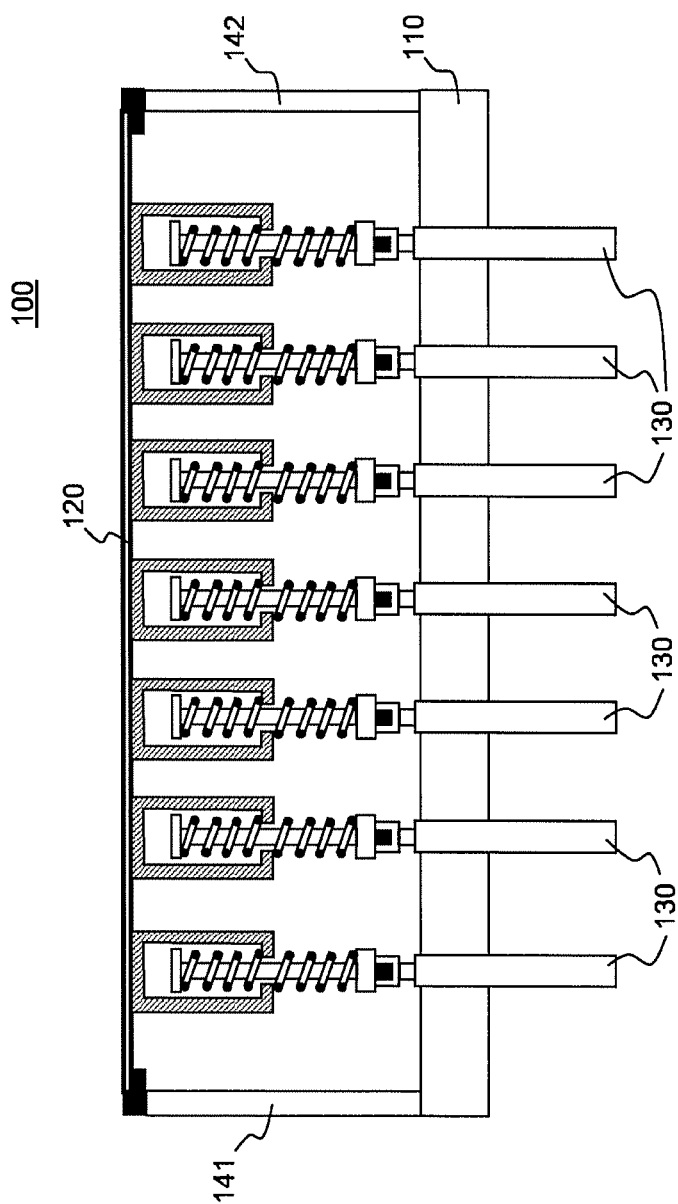
FIG. 4, a diagram illustrating an example of a deformable mirror outfitted with actuators according to the present description.

The actuator 130 as just described is designed to be mounted within a deformable mirror, one example of which is shown in FIG. 4. The deformable mirror 100 comprises a frame 110 on which is mounted a deformable reflective substrate 120. The substrate 120 may be attached to said frame 110 by a rigid mechanical linkage or by a flexible linkage, it being possible to produce this linkage by means of one or more mechanical elements (flexible or rigid feet or crowns, glued jacks, etc.). The deformable mirror 100 furthermore comprises a plurality of actuators 130 according to the present description, such as actuators described with the aid of the examples presented above. Each actuator 130 is attached by one end of the floating head to one face of the deformable reflective substrate 120 opposite the reflective face of the substrate. Moreover, each actuator 130 is mounted on the frame such that the stationary body of the actuator is integrated with the frame.

As previously described, in one embodiment where the drive rod 20 of the actuator 130 comprises a drive arm 25 and a removable rod 26 (see FIG. 2A for example), it may be advantageous for the coupling force of the rod 26 with the drive arm 25 to be less than the maximum allowable force dictated by the elastic means 33 and 35 of the floating head 30.

Figure 5:
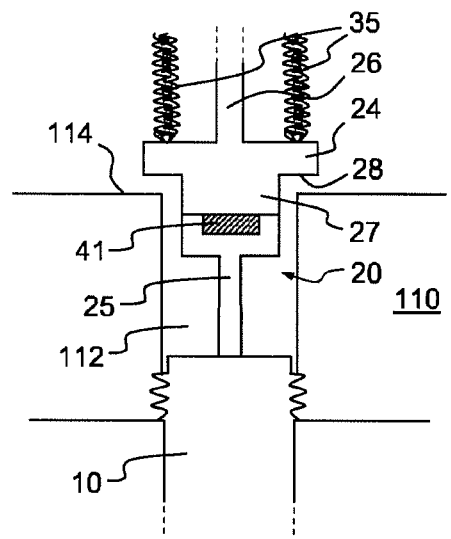
FIG. 5, a diagram illustrating the disposition of an actuator in the frame of a deformable mirror such that the frame forms an abutment for the drive rod, according to one sample embodiment.

FIG. 5 shows an example of the arrangement of actuators within the frame 110 of the deformable mirror providing a mechanical abutment for the drive rod 20, preventing any deterioration of the elastic means of the floating head 30 during the process of decoupling of the drive arm 25 and the stationary body 10 from the removable assembly of rod and floating head. In this example, the drive rod 20 of the actuator (only a portion of which is shown in FIG. 5) is at least partly inserted in an orifice 112 produced in the frame 110. The orifice 112 forms a housing for the drive arm 25. A cross piece 24 of the drive rod 20 is adapted to abut against the surface 114 formed on the surface of the frame, near the orifice 112, during the process of decoupling of the drive arm 25 and the stationary body 10 from the removable assembly of rod and floating head. In the case when the coupling device 40 comprises a magnet 41 inserted in the drive arm 25, this may be positioned below the surface 114 of the orifice 112. The cross piece 24 then comprises a projecting portion 27, this projecting portion being able to make contact with the magnet 41 when the drive arm 25 is mounted. Furthermore, the surface 114 forms an abutment for the cross piece 24. In this way, when removing the drive arm 25 and the stationary body 10, the cross piece 24 of the drive rod 20 remains above the surface 114, preventing any damage to the elastic means of the floating head 30.

Although described through a certain number of embodiments, the actuator of the invention comprises different variants, modifications and improvements which will be obvious to the person skilled in the art, it being understood that these different variants, modifications and improvements are part of the scope of the invention as defined by the following claims.

The invention claimed is:

1. An actuator for generating a bidirectional force, the actuator comprising:
    a stationary body;
    a drive device; and
    a drive rod able to be driven in a translatory movement with respect to the stationary body, along an axis of translation, by the drive device,
    wherein the actuator is configured to be integrated into a deformable mirror comprising a deformable reflective substrate and the actuator further comprises:
    a floating head configured to be attached to the deformable reflective substrate, and mounted in floating manner with respect to the drive rod via first and second elastic means,
    wherein the first and second elastic means are each mounted between the drive rod and the floating head and are configured to apply forces to the floating head, whose projections on the translation axis are of opposite directions.

2. The actuator as claimed in claim 1, wherein the drive rod comprises a drive arm and a rod mounted in removable manner on the drive arm, the actuator further comprising means of coupling the rod to the drive arm.

3. The actuator as claimed in claim 2, wherein the coupling means comprise at least one magnet, inserted in the rod and/or in the drive arm.

4. The actuator as claimed in claim 1, wherein:
    the floating head comprises a casing arranged about an upper portion of the drive rod, the casing having an upper wall configured to be attached to the deformable substrate and a lower wall, opposite the upper wall; and
    the first elastic means is mounted between the upper portion of the drive rod and the lower wall of the casing.

5. The actuator as claimed in claim 4, wherein the second elastic means is mounted between a lower portion of the drive rod situated outside of the casing and the lower wall of the casing.

6. The actuator as claimed in claim 4, wherein the second elastic means is mounted between the upper portion of the drive rod and the upper wall of the casing.

7. The actuator as claimed in claim 5, wherein the first and second elastic means are formed by identical elements.

8. The actuator as claimed in claim 1, wherein:
    the first elastic means works by compression and is mounted between the drive rod and the floating head; and
    the second elastic means works by traction and is mounted between the drive rod and the floating head.

9. The actuator as claimed in claim 1, wherein the drive rod comprises at least one cross piece for the mounting of the first and/or the second elastic means.

10. The actuator as claimed in claim 1, wherein the first and second elastic means are prestressed.

11. The actuator as claimed in claim 1, wherein the first and second elastic means comprise one or more traction or compression springs.

12. The actuator as claimed in claim 1, wherein the drive device comprises a linear motor.

13. A deformable mirror comprising:
    a frame; and
    a deformable reflective substrate attached to the frame; and
    a plurality of actuators as claimed in claim 1, the stationary body of each actuator being integrated in the frame and the floating head of each actuator being integrated in the deformable substrate.

14. The deformable mirror as claimed in claim 13, wherein the frame comprises, for each actuator:
    a housing able to receive at least partly the stationary body of the actuator, and
    a surface near the housing, forming an abutment for the drive rod of said actuator.

* * * * *